United States Patent [19]

Acda et al.

[11] 4,394,343
[45] Jul. 19, 1983

[54] PROCESS FOR THE FORMING OF COUPLING PIECES FROM A THERMOPLASTIC

[75] Inventors: Petrus M. Acda; Jacob Karreman, both of Enkhuizen, Netherlands

[73] Assignee: Polva Nederland B.V., Enkhuizen, Netherlands

[21] Appl. No.: 102,655

[22] Filed: Dec. 12, 1979

[30] Foreign Application Priority Data

Dec. 12, 1978 [NL] Netherlands .......................... 7812063
Dec. 12, 1978 [NL] Netherlands .......................... 7812066

[51] Int. Cl.³ ............................................... B29C 7/00
[52] U.S. Cl. ..................................... 264/296; 264/318
[58] Field of Search ............................... 264/318, 296

[56] References Cited

U.S. PATENT DOCUMENTS

| | | | |
|---|---|---|---|
| 4,006,757 | 2/1977 | Acda et al. | 425/393 |
| 4,113,813 | 9/1978 | Wilson | 264/296 |
| 4,127,632 | 11/1978 | Anger | 264/318 |

Primary Examiner—James H. Derrington
Attorney, Agent, or Firm—Spencer & Kaye

[57] ABSTRACT

Process and device for the forming, on the end of a pipe made of a thermoplastic, of a coupling piece possessing an undercut annular groove intended for receiving an annular seal, according to which process and device the coupling piece is initially preformed by means of a forming core which possesses an annular rib for forming the annular groove, the core then being withdrawn from the partially cooled coupling piece by virtue of an elastic deformation of the part possessing the groove, by means of the rib of the forming core, and this part being kept at the elastic deformation temperature, and according to which this part is subjected to a postforming operation, before it has completely cooled, by means of a postforming ring.

3 Claims, 17 Drawing Figures

PROCESS FOR THE FORMING OF COUPLING PIECES FROM A THERMOPLASTIC

BACKGROUND OF THE INVENTION

The present invention relates to an improved process for the forming of coupling pieces from a thermoplastic, which coupling pieces are provided with at least one undercut annular groove, in which process the thermoplastic is shaped, by means of a forming core provided with an annular rib of which the external circumference corresponds to the shape which is to be imparted to the coupling piece, under temperature and pressure conditions which are such that the forming core is closely surrounded by the thermoplastic, and such that a coupling piece provided with an undercut annular groove is preformed, part of the coupling piece preformed in this way is cooled so that the narrowed terminal part of the coupling piece, extending from the free end of the coupling piece to the point of greater depth of the undercut, is kept at a temperature which is such that this part remains elastically deformable, the forming core, including the rib with which it is provided, is then removed from the coupling piece through the narrowed part by virtue of an elastic deformation of the latter, the elastically deformed terminal part is then cooled to a temperature which is such that the thermoplastic is no longer deformable, and, finally, the coupling piece formed in this way is completely separated from the forming core. The present invention also relates to a device suitable for carrying out this process.

A process of this type is described in German patent application No. 2,633,050 in the name of ANTON ANGER MASCHINENBAU GmbH. In accordance with this known process, in which the forming core is surrounded by the thermoplastic by injection moulding, the elastically deformed terminal part of the moulded coupling piece finally resumes its preformed shape, under the effect of its elasticity, after the forming sleeve has been withdrawn.

However, this known process exhibits the disadvantage that the precision of shape and dimensions of the deformed terminal part of the coupling piece produced in this way greatly depends on the temperature maintained in the thermoplastic, and also on the shape of the undercut, and is thus difficult to control. In practice, this known process is not in fact suitable as such for the production of coupling pieces for which a high precision of shape and dimensions is required.

SUMMARY OF THE INVENTION

The object of the present invention is to overcome these disadvantages and therefore to permit, in a reproducible manner, the production of coupling pieces possessing an undercut of large depth and of divergent shape, with a very high precision of shape and size.

This result is essentially achieved in the process according to the invention by virtue of the fact that the narrowed terminal part of the coupling piece preformed in accordance with the process described above is postformed, to give the desired final shape, after elastic deformation and before complete cooling.

Thus, after its elastic deformation due to the withdrawal of the forming core, the terminal part of the preformed coupling piece is postformed in a positive manner and is thus returned exactly to the desired original shape, which corresponds to the preformed shape before elastic deformation. By virtue of this postforming step, the process according to the invention is less dependent on the elasticity of the thermoplastic to be worked and on the shape of the undercut. The process according to the invention therefore makes it possible to produce coupling pieces provided with a large undercut of various shapes, with a very high precision as regards the shape and the dimensions.

Preferably, in the process according to the invention, the cooling of the terminal part of the coupling piece to a temperature which is such that the thermoplastic is no longer deformed is carried out during the postforming operation.

The coupling pieces obtained by the process according to the invention possess a narrowed terminal part and are provided with an undercut for which the precision of shape and dimensions is at least equal to that of the remaining part, and their external surface does not possess a weld. This precision of shape and dimensions is such that, when the coupling piece is connected up in cooperation with a coupled pipe, there is no risk of leakage through the axial displacement, due to the pressure prevailing in the pipe, of a sealing ring subsequently introduced into the undercut.

The present invention also relates to a particular device for carrying out the process according to the invention. This device, which mainly comprises a forming core provided with an annular groove, which forming core can move axially between a rest position and a working position, also comprises, according to the invention, a postforming element which can move, relative to the forming core, between a rest position and a working position, and the shape of which is similar to part of the shape of the forming core.

According to a modified embodiment of the device according to the invention, which modified embodiment will be described in greater detail below, it is possible to use a forming core provided with channels which are connected to a source of vacuum and which emerge on the external circumference of the forming core, or to use a forming core which cooperates with a forming sheath and with a closing ring in order to form a closed preforming space.

The postforming element, the general shape of which is preferably annular, can be constructed from one or more separable pieces.

According to the preferred embodiment, the postforming element is equipped with an internal cooling chamber. Thus, rapid cooling of the terminal part can be achieved during the postforming thereof, and the duration of the working cycle of the device can thus be shortened.

According to a particular embodiment, the device according to the invention comprises a forming core, the general shape of which is cylindrical and which is provided with a peripheral rib, a forming sheath and a closing ring, which can move, relative to one another and relative to a collar for clamping the pipe on which work is to be carried out, between a rest position and a working position, and which, in the working position, delimit a preforming space which corresponds to the shape of the sleeve to be formed, means for the relative displacement of the forming core, of the forming sheath, of the closing ring and of the clamping collar, and a postforming element which can move, relative to the forming core and to the forming sheath, between a rest position and a working position, and which, in the working position, delimits, together with the forming core and the forming sheath, a postforming space which corresponds to the terminal part of the sleeve to be formed.

According to a preferred embodiment of the device according to the invention, circulation chambers for the circulation of heating or cooling means are provided in the forming core and in the postforming element and, if appropriate, in the forming sheath and in the closing ring. In this way, by correctly phasing the circulation of a heating fluid and/or cooling fluid in these chambers, the process according to the invention can be carried out in an optimum and perfectly controlled and reproducible manner for different products, whilst having a beneficial influence on the precision of shape and dimensions of the resulting products.

According to another preferred embodiment, the device according to the invention comprises a postforming element which is constructed in the form of a pressure ring and can move axially, relative to the core and to the forming sheath. The postforming space is then formed by axial displacement of the pressure ring against the forming sheath which acts as a stop for the pressure ring and permits a safer and more precise positioning of this ring in the working position.

In another embodiment, the closing ring is also constructed in the form of a pressure ring, the minimum internal diameter of which is greater than the maximum external diameter of the rib provided on the forming core.

This last embodiment is particularly suitable for the forming of sleeves in which the undercut groove is relatively large and/or in which the wall thickness is relatively high, and in which the external diameter at the free end of the sleeves is greater than the maximum internal diameter at the level of the groove formed. The closing ring is therefore preferably used as a pressure ring so as to perform the additional function of a postforming element, with the result that it is no longer necessary to provide a particular postforming ring and that the number of elements in the device is reduced.

A particular pressure ring, acting as a postforming element, is still necessary for the forming of sleeves having a relatively deep groove or having a relatively large wall thickness, in which sleeves the external diameter of the free terminal part is smaller than the maximum internal diameter at the level of the rib.

According to another preferred embodiment of the device according to the invention, the pressure ring can also move radially, relative to the forming core and to the forming sheath.

Admittedly, this embodiment employs a particular pressure ring which can move radially, independently of the closing ring. However, by virtue of this independent pressure ring, it is obviously possible to postform sleeves of various dimensions, shapes and wall thickness by adapting the pressure ring to suit the dimensions and the wall thickness of the sleeves to be postformed.

By virtue of the fact that, in another preferred embodiment of the device according to the invention, the pressure ring can be constructed in a single piece, it is possible, despite the use of an additional postforming element, to restrict the number of additional elements for displacing this ring, and also the number of cooling chambers. According to this embodiment, it is also necessary to withdraw the forming core from the preformed sleeve completely, in order to be able radially to bring the pressure ring, which is in a single piece, between the forming core and the preformed sleeve. Furthermore, the complete withdrawal of the forming core can be avoided if the pressure ring is constructed in several separable pieces. In this case, the travel of the core can be restricted to a minimum and this has a favourable effect on the duration of the production cycle.

The process and the device according to the invention are furthermore explained in greater detail by the description of a series of possible embodiments, in which description reference is made to the figures in the attached drawings.

DESCRIPTION OF THE PREFERRED EMBODIMENTS

Figure 1:
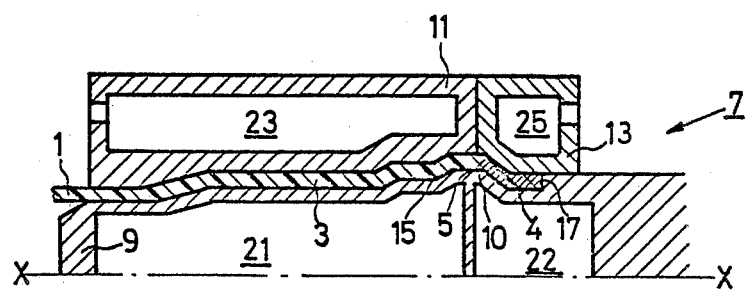
FIGS. 1-5 schematically represent an illustrative embodiment of a device, according to the invention, in successive operating steps during the forming of a coupling piece.

According to the embodiment illustrated by FIGS. 1 to 5, a coupling piece is formed on one end of an extruded pipe 1 made of a thermoplastic and having an axis XX, which coupling piece is provided with a sleeve 3, the diameter of which varies in steps, and possesses an annular groove 5 forming an undercut directed radially outwards, which groove can be used for the subsequent positioning of a sealing ring by employing a die 7 which mainly comprises a forming core 9, the diameter of which varies in steps and which is provided with an annular rib 10, a forming sheath 11 and a closing ring 13, and these can move axially, relative to one another, between a rest position and a working position, and which, in the working position as shown in FIG. 1, delimit a closed preforming space 15, the shape of which corresponds to that of the sleeve 3 to be formed. To preform the sleeve 3, the terminal part of the pipe 1 which is to be shaped to give a sleeve is heated to a temperature which is such that the thermoplastic is at least elastically deformable, and, after this heating, the end is introduced into the preforming space 15 so as to fill this space completely and to surround the forming core 9 completely, with the result that the heated end of the pipe is preformed to give a sleeve 3 provided with a groove 5 and with a shrunk terminal part 4.

In a following step, the sleeve 3 thus formed is cooled in such a way that, however, the terminal part 4 is kept at a temperature which is such that the said terminal part still remains elastically deformable.

Figure 2:
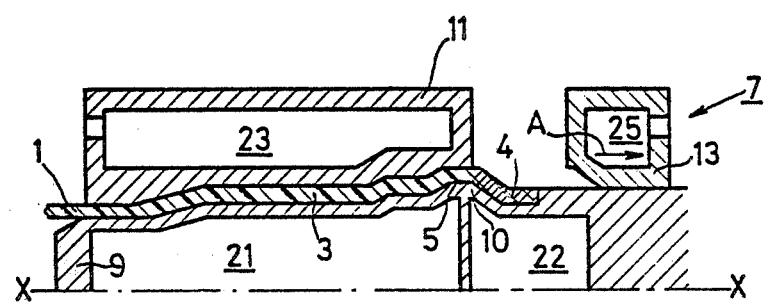

As shown in FIG. 2, the closing ring 13 is then withdrawn axially, relative to the forming core 9, in the direction of the arrow A and in such a way that the terminal part 4 rests freely on the external circumference of the forming core.

Figure 3:
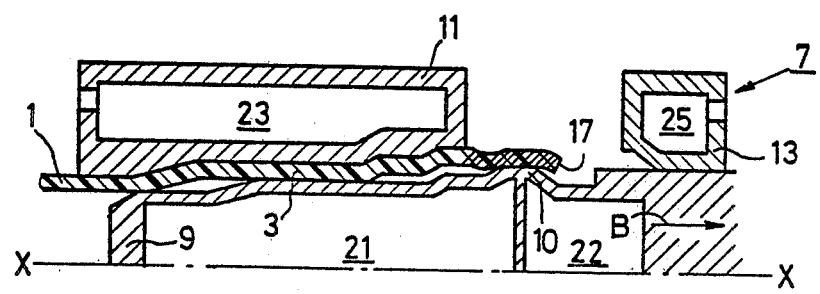

In the following stage, which is shown in FIG. 3, the forming core 9 is displaced in the direction of the arrow B by a distance which is such that the rib 10 is withdrawn through the narrowed part 4 of the sleeve 3, which part is deformed elastically and radially outwards.

Figure 4:
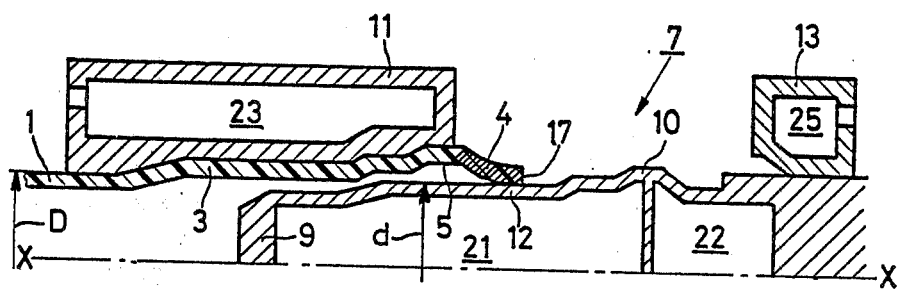
Figure 5:
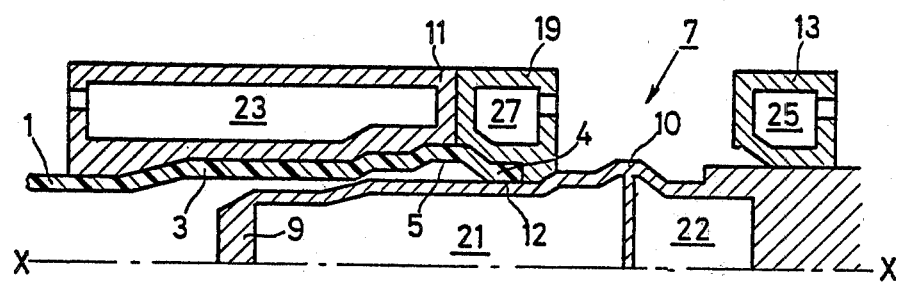

By virtue of the elasticity of the thermoplastic, the deformed terminal part 4 tends to resume the shape which had been imparted thereto in the preceding preforming step, with the result that the free end 17 of the sleeve 3 can come into contact with the cylindrical part 12 of the forming core, which cylindrical part is located behind the rib 10, and the external diameter d of which is virtually identical to the external diameter D of the pipe 1. This situation is illustrated in FIG. 4.

Subsequently, according to the invention, the narrowed and elastically deformed terminal part 4 is postformed mechanically, in the axial and radial direction, by means of a postforming element 19, and is thus returned to the shape imparted during preforming. The postforming of the terminal part 4 is conjointly limited in the radial direction by the forming core 9 and in the axial direction by the moulding sheath 11 which acts as a stop for the postforming element 19.

The postformed terminal part 4 is then cooled in this state, and, finally, the postforming element 19 is again moved away and the forming core 9, the forming sheath 11 and the pipe 1 are displaced, relative to one another, so as to free the pipe 1 equipped with the sleeve 3 in its definitive shape.

To heat and cool the various parts of the sleeve 3 during its production, the forming core 9, the forming sheath 11, the closing ring 13 and the postforming element 19 are equipped with chambers 21, 22, 23, 25 and 27 for the circulation of a heating and/or cooling medium.

The illustrative embodiment of the device, according to the invention, which has now been described is particularly designed for the forming of coupling pieces and sleeves which have a relatively large wall thickness and/or in which the reduction in wall thickness, due to the increase in the diameter, is compensated or even over-compensated, and in which the wall thickness is determined by the height of the forming space 15, measured in the radial direction.

The thermoplastic on which work is to be carried out in the forming space 15 can be introduced by casting, by extrusion, by injection moulding or the like, or, as described in the illustrative embodiment explained, it can originate from a hot part of a tube obtained by extrusion.

Figure 6:
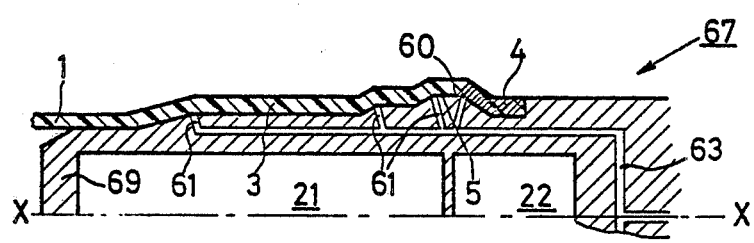
FIG. 6 shows another illustrative embodiment of the device according to the invention.

To form sleeves and coupling pieces which have a relatively low wall thickness and/or for which it is not necessary to compensate the wall thinning caused by the increase in the diameter, and for which the starting material is necessarily a tubular product, it is possible to use a simpler embodiment of the device according to the invention, which embodiment is represented schematically in FIG. 6. This device does not possess a forming sheath or a closing ring, and the preforming of the sleeve is carried out pneumatically.

For this purpose, the device 67 comprises a forming core 69 provided with an annular rib 60 and with channels 61 which emerge on the external wall of the forming core 69, and which are connected, via a common line 63, to a source of vacuum which is not shown.

In this device, after having introduced the forming core 69 into the heated part of the pipe 1, the thermoplastically deformable material of which follows the external shape of the core 69, a vacuum is applied, via the channels 61–63, to the external surface of the forming core so as to impart, to the sleeve 3 preformed in this way, exactly the same shape as that of the external circumference of the forming core 69.

The cooling and the temperature maintenance for the preformed sleeve, and also the subsequent forming steps, are similar to those which have already been described with reference to the device illustrated in FIGS. 1–5. This device is also provided, according to the invention, with a postforming element 19 for the postforming of the terminal part 4 of the preformed sleeve, which part is elastically deformed during the partial withdrawal of the forming core.

According to another embodiment of the device according to the invention, which embodiment is illustrated in FIGS. 10–13, the device mainly comprises a forming core 9 in a single piece, which comprises an annular peripheral rib 10 of external diameter R and is provided with two circulation chambers 21 and 22 which function as heating or cooling chambers.

The external circumference of the forming core 9 matches the internal circumference of the sleeve 3 to be formed. The forming core is fixed to a support plate 2 which can move axially, together with the forming core, by means of a hydraulic cylinder 6 which is located in a casing 8. The device also comprises a forming sheath 11 consisting of two forming shells 12 which can be separated radially by mechanical, pneumatic or electrical means which are not shown. Each shell 12 possesses a circulation chamber 23 which serves both as a heating chamber and as a cooling chamber. The device also comprises a closing ring 13 of internal diameter T, which is provided with a circulation chamber 25 which functions solely as a heating chamber. The closing ring 13 can move axially, relative to the forming core 9, by means of a hydraulic unit 14. The device also comprises a clamping collar 16 which consists of two radially separable clamping flanges 18 and can be displaced axially by means of a hydraulic unit 20. Finally, the device comprises a postforming element 19 which is in the form of a pressure ring of diameter S and is provided with a cooling chamber 27. This element can be displaced axially and radially in a manner which is in itself known. Carrying elements 39 and 41 are fixed respectively to the pressure ring 19 and the plate 2. The pressure ring 19 is further provided with a connecting member 37 coupled to a hydraulic cylinder which is not shown. The forming core 9, the casing 8, the forming sheath 11, the closing ring 13, the clamping collar 16 and the pressure ring 19, which serves as a postforming element, are arranged on a frame 26 which is only represented schematically. By means of the hydraulic units 6, 14 and 20, the forming core 9, the closing ring 13 and the clamping collar 16 can be displaced coaxially, in the axial direction relative to one another, in the direction of the common axis YY of these elements.

The device described functions in the following manner.

Figure 10:
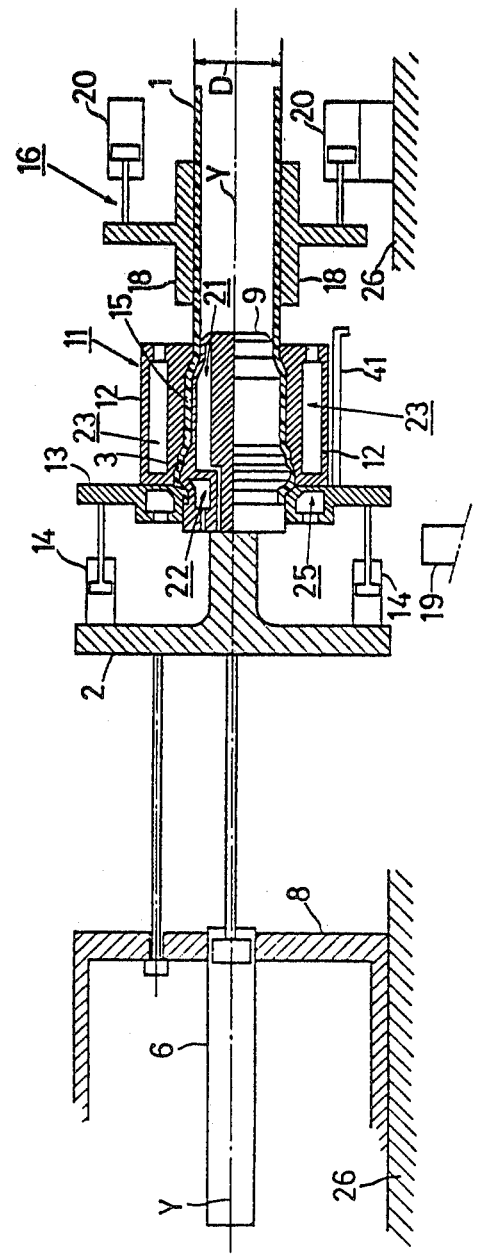
FIG. 10 shows, in longitudinal section, a third possible embodiment of the device according to the invention.

For the forming of a sleeve 3 on the end of the pipe 1 made of a thermoplastic and having an external diameter D, the said sleeve possessing an annular groove 5, for the subsequent positioning of a sealing ring, and a shrunk end 4, the internal diameter of which is virtually equal to the external diameter D of the pipe, the forming core 9, the forming sheath 11 and the closing ring 13 are brought into the working position illustrated in FIG. 10, in which position these elements delimit a preforming space 15 which corresponds to the shape to be imparted to the sleeve 3. Subsequently, the pipe 1, of which the end to be formed is heated to a temperature which is such that its constituent thermoplastic is mouldable, is fixed in the clamping collar 16 and is pushed, by its heated end, into the preforming space 15 until this space is completely filled. Thus, the heated end undergoes an increase in diameter as well as a compression which is in itself known from U.S. Pat. No. 4,006,757, filed in the name of POLVA-NEDERLAND B. V. In this working stage, a heating fluid, such as, for example, hot oil, circulates in the chambers 21 and 22 of the forming core 9, in the chamber 23 of the forming shells 12, and in the chamber 25 of the closing ring 13. When the preforming space 15 is completely filled and the end of the pipe 1 has the desired shape, the heating fluid in the chamber 21 of the forming core and in the chamber 23 of the shells 12 is replaced by a cooling fluid, whereupon that part of the sleeve 3 which is surrounded by these chambers is cooled so that it preserves the shape which has been imparted thereto. On the other hand, by circulating a hot fluid in the chambers 22 and 25, the terminal part 4, which is directed towards the inside of the sleeve 3, from the free end to the groove 5, and which is enclosed by the closing ring 13 and the rear part of the forming core 9, is kept at a temperature which is such that the said terminal part remains elastically deformable. This situation is shown in FIG. 10, in which the pressure ring 19 is in the rest position.

In a following forming stage, the closing ring 13 is displaced backwards in the direction of the support plate 2, with the result that the terminal part 4 of the preformed sleeve 3 is released.

Figure 11:
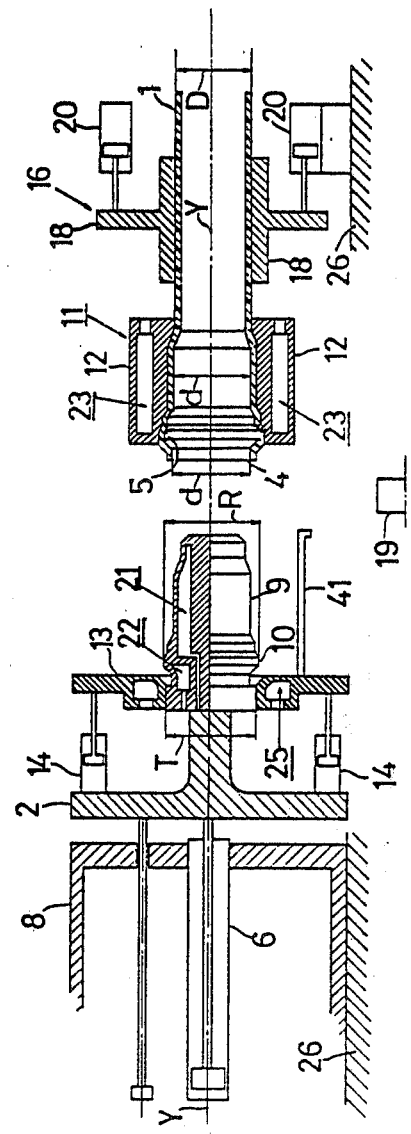
FIGS. 11-13 show the device according to FIG. 10, in successive operating positions.

The forming core 9 is then also displaced in the axial direction towards the casing 8 and is thus withdrawn from the sleeve 3, with the consequence that the terminal part 4 of the sleeve 3 is elastically deformed by the rib 10 projecting from the forming core 9. The distance of withdrawal of the forming core 9 is such that a free space exists between the end of this core and the end of the sleeve 3. This situation is illustrated by FIG. 11, in which the pressure ring 19 is still in the rest position.

Figure 12:
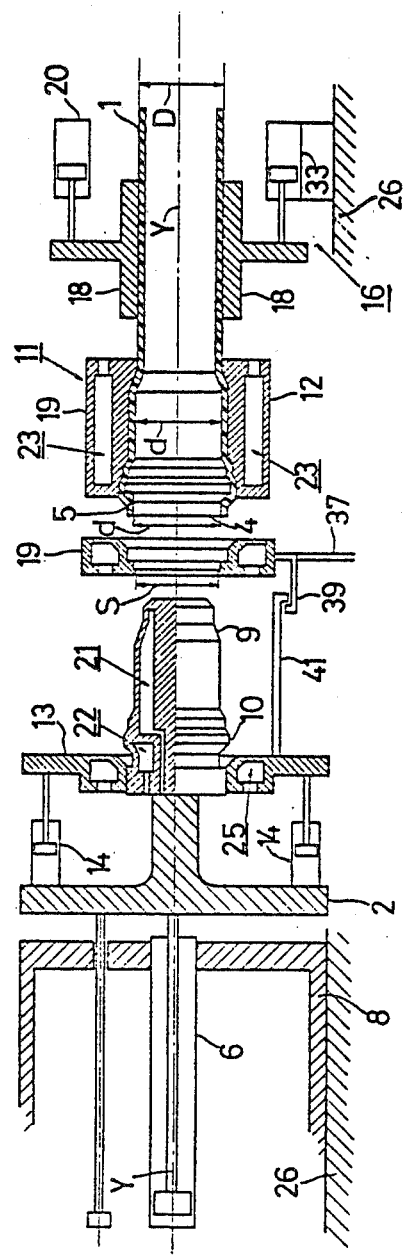

As shown in FIG. 12, the pressure ring or postforming ring 19 is then brought, by means of a radial displacement, into the free space between the forming core 9 and the end of the sleeve 3, so that it is coaxial with the forming core 9.

The forming core 9 is then again displaced axially in the direction of the forming sheath 11 and partially penetrates into the sleeve 3 by means of its leading end.

The pressure ring 19 is carried along by this axial displacement of the forming core 9 and is pressed against the stop of the forming sheath 11. Thus, the forming core 9, the forming sheath 11 and the pressure ring delimit a postforming space which imparts, to the end 4 of the sleeve 3, an identical shape to that imparted during preforming, as shown in FIG. 10.

Figure 13:
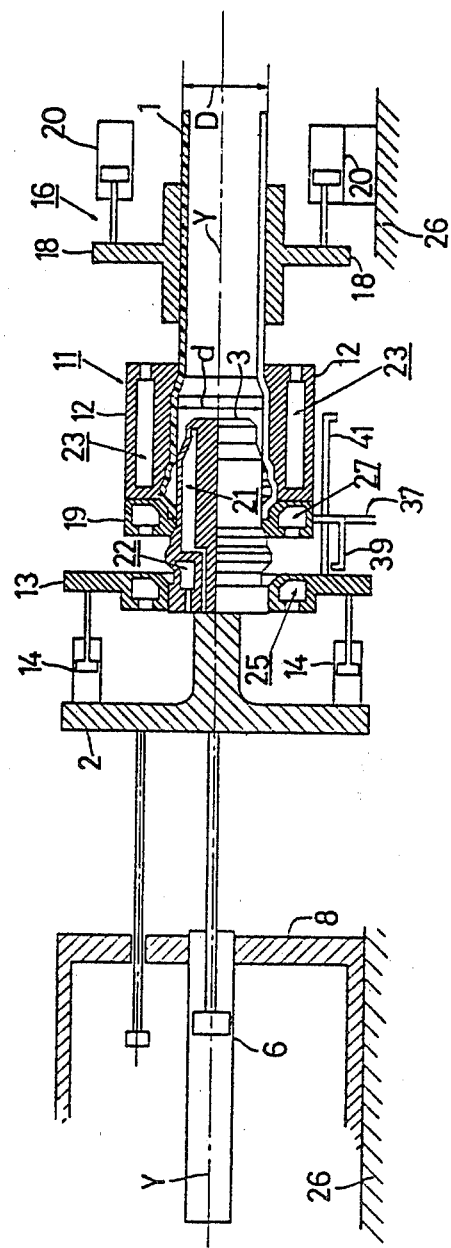

FIG. 13 shows the forming core 9, the forming sheath 11 and the pressure ring 19 in the working position, in which the end 4 of the sleeve 3 is enclosed in the postmoulding space. During the axial displacement in the indicated working position of the pressure ring, the terminal part 4 of the sleeve 3, which part is still elastically deformable, is postformed in the axial direction and in the radial direction.

The terminal part 4 of the sleeve 3 is then cooled, in order to render it undeformable, by circulating a cooling fluid in the circulation chamber 22 of the forming core and in the circulation chamber 27 of the pressure ring 19.

Finally, the forming core 9 is withdrawn from the sleeve 3, and the pressure ring 19 is also carried along, in this axial movement, by the carrying members 39 and 41. Subsequently, by means of a radial displacement outwards, the pressure ring 19 is returned to the rest position. After opening the forming sheath 11 and the clamping collar 16, the pipe can be withdrawn from the device, the forming core 9, the forming sheath 11 and the closing ring 13 are then returned to the working position, as shown in FIG. 10, and are brought back to the desired temperature for the purpose of treating the next pipe.

The embodiment according to FIGS. 10 to 13 is particularly designed for the forming of sleeves which are equipped with a groove 5 of relatively large depth and/or of relatively low thickness, and in which the internal diameter T of the closing ring 13 is smaller than the external diameter of the groove 5.

Figures 14A, 14B:
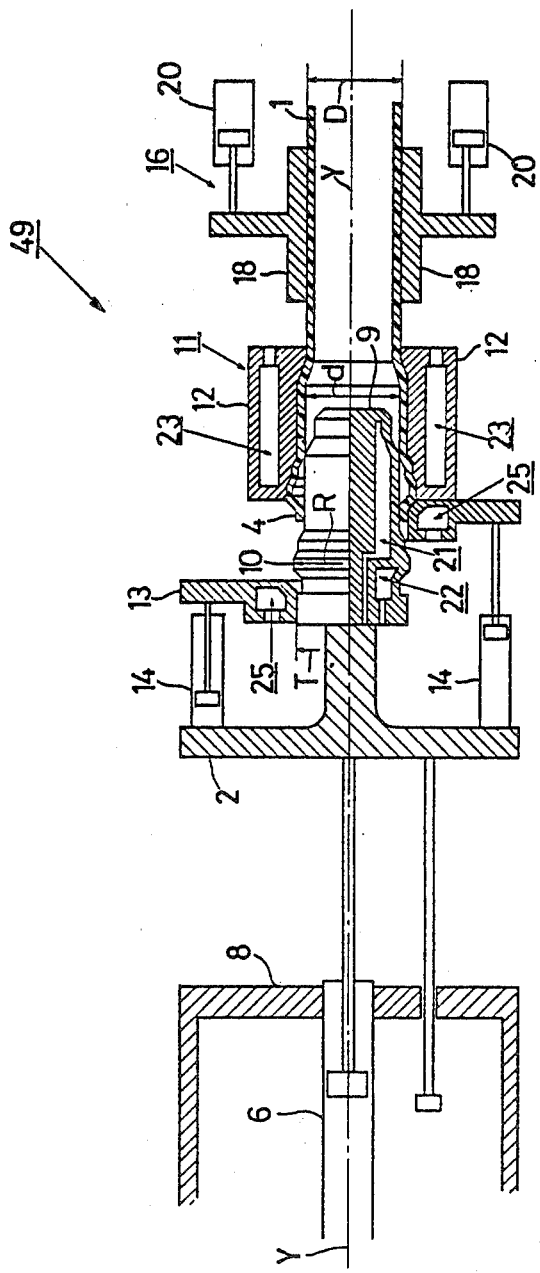
FIGS. 14a and 14b show a fourth possible embodiment of the device, according to the invention, in two different working stages.

FIGS. 14a and 14b show another embodiment of the device, according to the invention, in the rest position and in the working position. In this embodiment, the closing ring 13 also acts as a postforming element. The forming of the sleeve 3 on the end of the pipe 1 is carried out in the manner already explained with reference to FIG. 10. FIG. 14a corresponds to FIG. 11 but differs from the latter in that the forming core 9 is not completely withdrawn from the sleeve 3 because it suffices for the displacement of the mandrel to be such that the rib 10 is withdrawn beyond the shrunk part 4 of the sleeve 3. FIG. 14b illustrates the situation corresponding to FIG. 13, in which the forming core 9, the forming sheath 11 and the closing ring 13 are in the working position and delimit a postforming space.

As is apparent from FIGS. 14a and 14b, the internal diameter T of the closing ring is greater than the maximum diameter R of the forming core 9 at the level of the rib 10. This embodiment of the device according to the invention is therefore designed in particular for the forming of a sleeve 3 which has an internal groove of relatively small depth and/or of large wall thickness, and in which the external diameter on the free terminal end is greater than the maximum internal diameter at the level of the groove. The successive steps, and also the stages involving the heating and cooling of the various constituent elements, are analogous to those which have been described with reference to the device according to FIGS. 10-13. Because of the fact that, in this embodiment, the forming core 9 is not completely withdrawn from the sleeve before postforming, the working cycle is shortened.

Figures 15A, 15B:
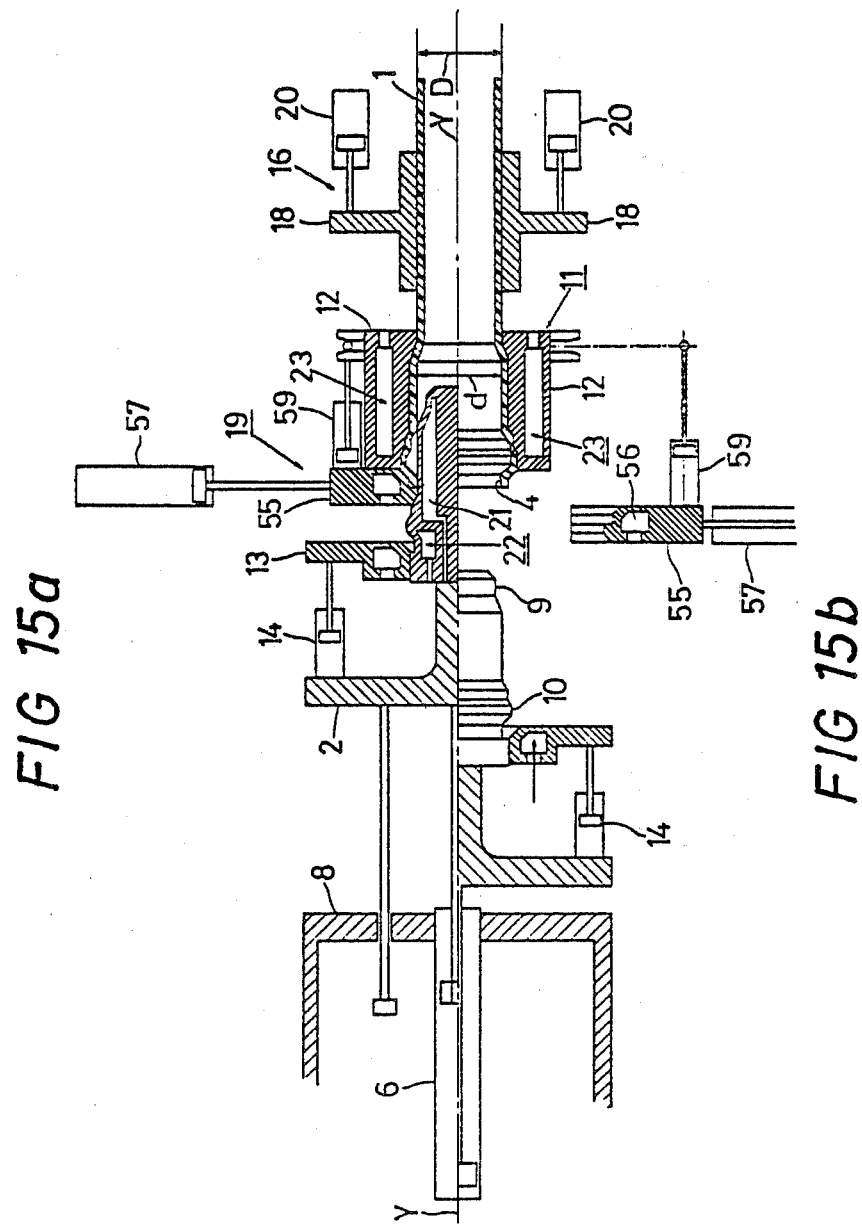
FIGS. 15a and 15b show a fifth possible embodiment of the device, according to the invention, in two different working stages.

FIGS. 15a and 15b also show another embodiment of the device according to the invention, in which embodiment the two-part pressure ring 19 consists of two halfrings 55, each of which is provided with a circulation chamber 56. FIG. 15a shows the device in the working position, that is to say in an analogous position to that of FIGS. 13 and 14a, during the postforming stage in which the forming core 9, the forming sheath 11 and the pressure ring 19 delimit a postforming space. Each half-ring 55 can move in the radial direction by means of a hydraulic unit 57 and in an axial direction, independently of the forming core 9, by means of a hydraulic unit 59. The sequence of the working stages and of the heating and cooling stages is analogous to that which has already been described above. In this embodiment, the forming core is only withdrawn from the sleeve 3, before postforming, by a distance which is such that the rib 10 is removed from the groove 5.

According to a last possible embodiment of the device according to the invention, which is derived from the previous embodiment, the closing ring performs the function of the pressure ring and therefore consists of two parts.

Figure 7:
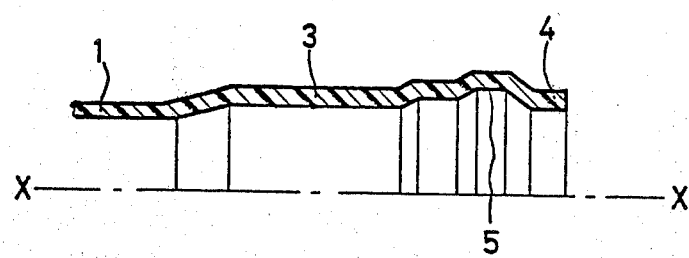
FIG. 7 shows, in longitudinal section, a coupling piece formed in accordance with the process of the invention.

FIG. 7 shows a sleeve 3 with the annular groove 5, which sleeve is formed by the process of the invention and by means of the devices described above, and in which the precision of shape and dimensions on the internal wall of the narrowed part 4 is similar to the precision on the cooled front part of the sleeve.

Figure 8:
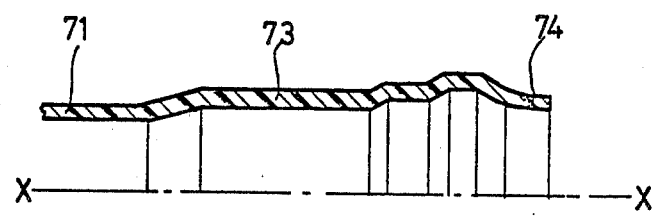
FIG. 8 shows, by way of comparison, in longitudinal section, a coupling piece formed in accordance with the known prior art.
Figure 9:
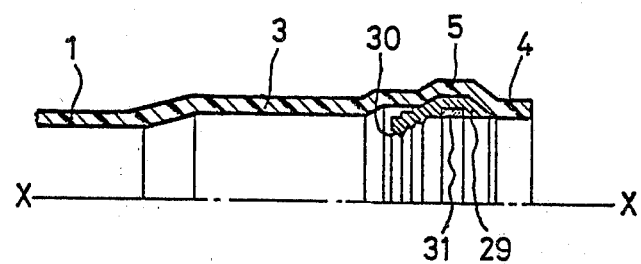
FIG. 9 shows a coupling piece formed in accordance with the process of the invention, which coupling piece comprises a sealing ring introduced after the forming thereof.

By way of comparison, FIG. 8 schematically represents a sleeve 73 on the end of a pipe 71 of which the narrowed terminal part 74 is not postformed and does not correspond to the desired shape. FIG. 9 shows a sleeve 3 formed on the end of a pipe 1 by the process of the invention, with a sealing ring 29 which is located in the groove 5 and is provided with a sealing lip 30. This ring is held in position by means of a blocking ring 31.

By virtue of the high precision of its shape and dimensions, the coupling piece obtained in accordance with the process of the invention makes it possible to couple pipes easily and safely, whilst at the same time guaranteeing a reliable seal.

The described embodiments of the invention relate to the forming of a coupling piece comprising a single sleeve. The invention can obviously also be used for the production of coupling pieces with a sleeve at both ends of the piece. For this purpose, it suffices to duplicate the constituent elements of the devices described.

We claim:

1. Process for the forming of coupling pieces from a thermoplastic, which coupling pieces comprise at least one annular undercut and present a free end and a terminal part which is located between the free end and the location of the greatest depth of the undercut and which is narrowed in the direction from the greatest depth of the undercut, in which process the thermoplastic is formed with the aid of a forming core which is provided with an annular rib, and the external surface of which corresponds to the internal surface of the coupling piece to be formed, the forming being carried out at a pressure and a temperature which are such that the forming core is closely surrounded by the thermoplastic, so as to form a coupling piece with an annular undercut, part of the coupling piece preformed in this way is cooled, the narrowed terminal part of the coupling piece, from the free end to the greatest depth of the undercut, being kept at a temperature which is such that this part remains elastically deformable, at least the part of the forming core provided with the annular rib is then withdrawn from the narrowed terminal part while provoking an elastic deformation of this terminal part, the elastically deformed terminal part is then cooled to a temperature at which the thermoplastic is no longer deformable, and the coupling piece formed in this way is completely withdrawn from the forming core, characterised in that the narrowed terminal part of the preformed coupling piece is postformed to give the desired final shape, after it has been elastically deformed and before it has completely cooled.

2. Process according to claim 1, characterised in that the cooling of the narrowed terminal part of the coupling piece is carried out during the postforming operation.

3. Process according to claim 1 or 2 characterised in that the annular rib is fixed in position relative to the forming core.

* * * * *